E. H. WHITING.
TRACTOR WHEEL.
APPLICATION FILED MAY 27, 1920.
1,388,679.
Patented Aug. 23, 1921.
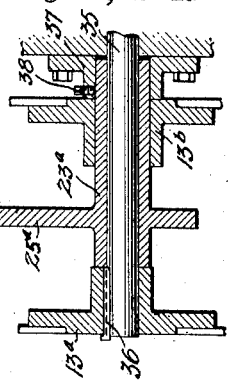
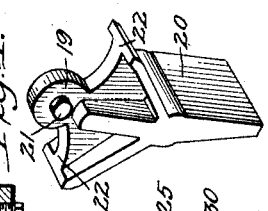
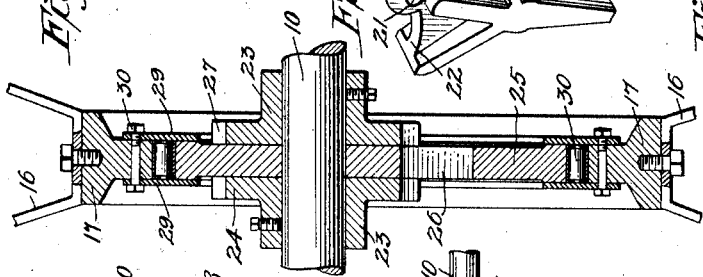
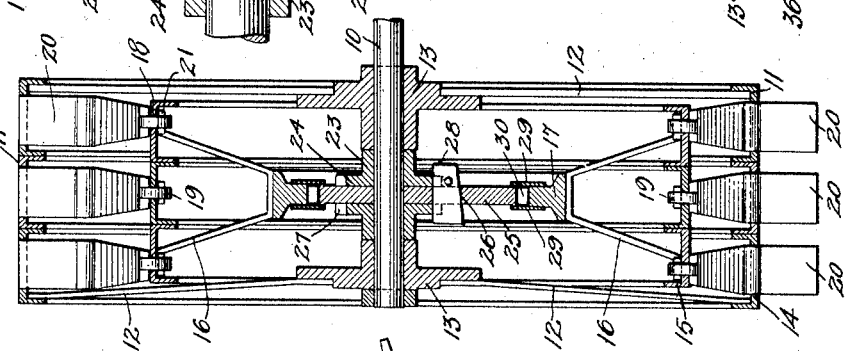
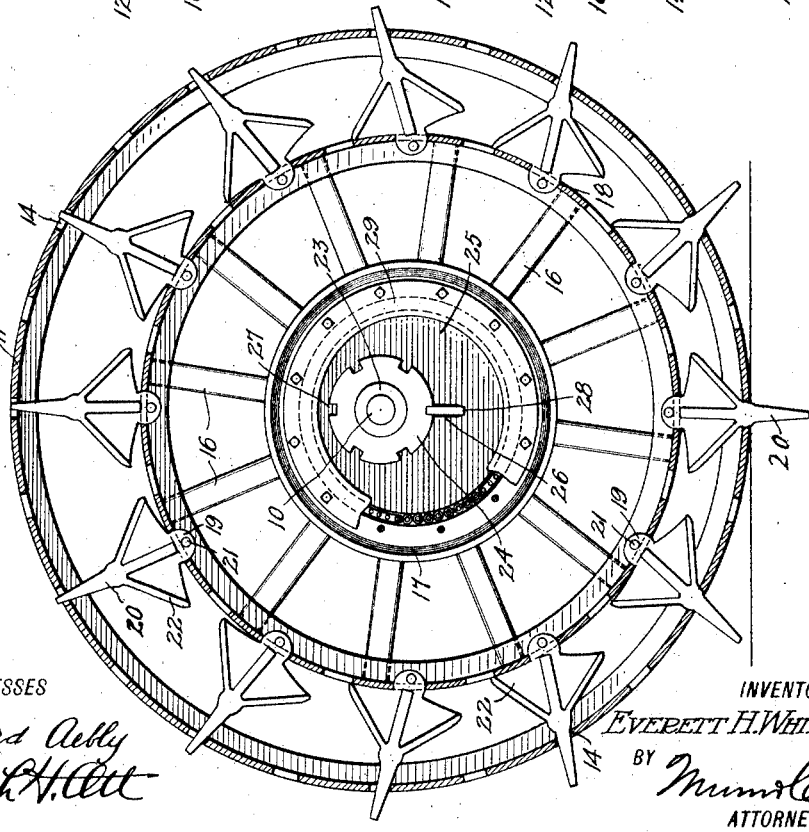
WITNESSES
Bernard Aebly
Hugh H. Att
INVENTOR
EVERETT H. WHITING
BY
Munn & Co
ATTORNEYS

UNITED STATES PATENT OFFICE.

EVERETT HOUSTON WHITING, OF SANTA ROSA, CALIFORNIA.

TRACTOR-WHEEL.

1,388,679.   Specification of Letters Patent.   Patented Aug. 23, 1921.

Application filed May 27, 1920. Serial No. 384,659.

*To all whom it may concern:*

Be it known that I, EVERETT H. WHITING, a citizen of the United States, and a resident of Santa Rosa, in the county of Sonoma and State of California, have invented a new and Improved Tractor-Wheel, of which the following is a full, clear, and exact description.

This invention relates to tractor wheels and has particular reference to an improvement in the traction elements employed in connection therewith.

A serious objection to the present form of tractor wheels, which include traction elements or blades fixedly secured to the periphery or tread of the wheel, is their tendency to clog with earth or clay thereby greatly reducing the effective functioning thereof.

It is therefore one of the principal objects of this invention to overcome this and other objections by providing a tractor wheel with means for automatically cleaning the traction elements upon each revolution thereof.

The invention further contemplates a tractor wheel having tractor elements which are capable of radial projection from the tread and means for effecting radial projection of said elements at their point of contact with the ground, said means also serving to retract the elements within the periphery of the wheel whereby to permit a scraper to co-act with the tread thereof for clearing the same of earth adhering thereto.

A still further object of the invention resides in the adjustable feature of the traction element projecting means, which permits of the shifting thereof to effect radial projection of the elements from the tread surface at various points relative to the spindle upon which the tractor wheel is mounted. This feature is found to be especially useful in the great western farming areas where tractors are run in a straight away course up or down hill for long periods of time.

With the above recited and other objects in view, some of which will be more apparent as the nature, purpose and operation of the invention is better understood from the following detailed description and claims, reference is had to the accompanying drawings forming a part of this application, and in which;

Figure 1 is a vertical sectional view through a tractor wheel constructed in accordance with the invention.

Fig. 2 is a transverse sectional view therethrough.

Fig. 3 is an enlarged fragmentary transverse sectional view.

Fig. 4 is a detailed perspective view of one of the traction elements.

Fig. 5 is a fragmentary transverse sectional view illustrating the method of application of the tractor to a rotating driving shaft.

Referring to the drawings by characters of reference, 10 designates the spindle of a fixed axle. The tractor wheel as here illustrated comprises a plurality of mating annular channel sections 11, the outermost of which are connected by the spokes 12 to the hubs 13 which are rotatably mounted on the spindle 10. The tread surface of the sections 11 are provided with radial openings 14. An inner wheel of lesser diameter than the outer wheel is constructed from a plurality of mating channel sections 15 which are secured together and connected by the spokes 16 to an annulus 17. Each of the sections 15 are provided with a plurality of radial openings 18 corresponding in number to the radial openings 14 in the sections 11 and said openings 18 are designed to receive the circular knuckle 19 of the traction elements 20. The knuckles 19 are inserted through the openings 18 and a transverse bearing pin 21 is inserted therethrough to provide oppositely projecting trunnions which bear on the inner periphery of the sections 15 to permit of relative rocking movements of the traction elements with respect to the inner wheel. In order to limit the rocking movement of the traction elements 20, the same are provided with the flanges 22 projecting from the opposite ends thereof. The spindle 10 has fixedly attached thereto between the hubs 13 a pair of spaced sleeves 23 having their spaced confronting ends provided with notched flanges 24. An eccentric disk 25 is disposed between the confronting flanges 24 and is provided with a slot 26 which is adapted to be alined with the notches 27 of the flanges 24 for the reception of a removable key 28. By this arrangement the eccentric disk 25 may be radially adjusted for a purpose to be hereafter described. The annulus 17 is provided with removable annular side plates 29 projecting inwardly thereof and provided with roller bearings 30. The side plates are designed to embrace the outer side edges of the eccentric disk whereby the inner wheel is eccentrically mounted with respect to the outer wheel, the roller bearings 30 being designed to engage and reduce the friction between the periphery of the eccentric disk and the annulus 17.

In use and operation of the wheel, the key 28 is engaged in the alined slot 26 and notches 27 of the eccentric disk 25 and flanges 24 respectively; the free extremities of the traction elements or blades 20 are disposed in the radial openings 14 of the sections 11 and upon rotation of the outer wheel, the inner wheel will be revolved therewith through the engagement of the flanges 22 of one or more of the elements 20 with the outer periphery of the inner wheel and the binding of said elements 20 in the radial openings 14. As the wheels rotate, the eccentric mounting of the inner wheel will serve to effect radial projection of the free extremities of the elements 20 at the point in its cycle of movement in line with the key. As the wheel continues to rotate the traction elements will be retracted within the tread surface of the outer wheel upon reaching a point opposite to that upon which the key is disposed. As the traction elements are retracted, clay or earth adhering thereto will be scraped therefrom by the engagement of the same with the side of the opening. By removing the key and registering the slot 26 with any of the other notches 27 in the flanges 24, the point of radial projection of the traction elements may be adjusted.

In adapting this type of tractor wheel to a rotating driving spindle 35 as illustrated in Fig. 5 of the drawings, the outer ends of the spindle 35 are keyed as at 36 to the outermost hub 13ᵃ and in this form the eccentric disk 25ᵃ is cast or otherwise formed on an elongated sleeve 23ᵃ which forms a bearing for the inner hub 13ᵇ. The inner extremity of the sleeve 23ᵃ is received in a thimble 37 secured to the frame of the tractor. The sleeve 23ᵃ is radially adjustable in the thimble and is secured in its adjusted position by a fastening element 38 carried by the thimble.

While there has been illustrated and described several preferred adaptations of the invention, no limitation is necessarily made to the precise structural details and it is understood that modifications which fall within the scope of the appended claims may be resorted to when found expedient.

Having thus described my invention, I claim as new and desire to secure by Letters Patent:—

1. In a tractor wheel, an outer rim, an inner rim, a plurality of traction elements pivoted to the inner rim, and means operable upon rotation of the wheel for effecting an eccentric movement of the inner rim with respect to the outer rim whereby to radially project and retract the free outer ends of the traction elements with respect to the outer rim at predetermined points in its cycle of rotation.

2. A tractor wheel comprising inner and outer rims, a plurality of traction elements pivotally carried by the inner rim, means on the outer rim for guiding the outer free ends of said traction elements, and means operable upon rotation of the wheel for effecting relative eccentric movement between the inner and outer rims whereby to cause radial projection and retraction of the traction elements from the outer periphery of the outer rim at opposite points in its cycle of rotation.

3. A tractor wheel comprising inner and outer rims, a plurality of traction elements pivotally carried by the inner rim, means on the outer rim for guiding the outer free ends of said traction elements, and means operable upon rotation of the wheel for effecting relative eccentric movement between the inner and outer rims whereby to cause radial projection and retraction of the traction elements from the outer periphery of the outer rim at opposite points in its cycle of rotation, the said means being adjustable to vary the points of projection and retraction of said traction elements.

4. The combination with an axle having a stationary cam mounted thereon for circumferential adjustments, of a tractor wheel including an outer rim having spaced openings therethrough, spaced hub sections concentrically connected to the outer rim and mounted on the axle spindle, an inner rim mounted on the cam, and traction elements pivoted to the inner rim with the free ends thereof extending through the openings in the outer rim whereby upon each rotation of the wheel radial projection and retraction of the free ends of the traction element from the outer rim will be effected at opposite points in its cycle of rotation.

5. The combination with an axle, of a stationary circumferentially adjustable cam, a tractor wheel including an outer ground engaging rim provided with spaced openings therethrough spaced eccentric hub sections connected to said outer rim and mounted on the axle at opposite sides of the cam, an inner rim mounted on the cam and traction elements pivoted for circumferential movements to said inner rim with the free ends extending through the openings in said outer rim for coupling the inner and outer rims for simultaneous rotation and for effecting radial contraction and projection of the outer ends of the traction elements from the outer periphery of the outer rim at opposite points in its cycle of rotation.

6. A tractor wheel comprising an outer rim having radial openings therethrough, an inner rim having a plurality of traction elements pivoted thereto with the free ends operable in said openings, and adjustable means for effecting an eccentric movement of the inner rim with respect to the outer rim upon rotation of said tractor wheel whereby to cause radial projection and retraction of said traction elements from the openings at predetermined points in its cycle of rotations.

7. A tractor wheel comprising a hollow ground engaging wheel having a plurality of openings in the tread thereof, an axle spindle upon which said wheel is concentrically mounted, a cam secured to said spindle, an annulus mounted on the cam, traction elements pivoted to the outer periphery of the annulus having their free extremities arranged in the openings, said traction elements serving to couple the annulus for rotation with the wheel whereby upon each rotation, radial projection and retraction of the traction elements will be effected at opposite points in its cycle of rotation.

8. A tractor wheel comprising a hollow ground engaging wheel having a plurality of openings in the tread thereof, an axle spindle upon which said wheel is concentrically mounted, a cam adjustably associated with said spindle, an annulus mounted on the cam, traction elements pivoted to the outer periphery of the annulus having their free extremities arranged in the openings, said traction elements serving to couple the annulus for rotation with the wheel whereby upon each rotation, radial projection and retraction of the traction elements will be effected at opposite points in its cycle of rotation.

EVERETT HOUSTON WHITING.